(12) United States Patent
Rosen

(10) Patent No.: US 8,141,791 B2
(45) Date of Patent: Mar. 27, 2012

(54) ENERGY MANAGEMENT IMPROVEMENT FOR A HEATING SYSTEM WITH REDUCED SETPOINT TEMPERATURE DURING NO OCCUPANCY BASED UPON HISTORICAL SAMPLING OF ROOM THERMAL RESPONSE WITH HIGHEST POWER HEAT APPLIED

(76) Inventor: Howard Rosen, Montreal (CA)

( * ) Notice: Subject to any disclaimer, the term of this patent is extended or adjusted under 35 U.S.C. 154(b) by 575 days.

(21) Appl. No.: 12/412,287

(22) Filed: Mar. 26, 2009

(65) Prior Publication Data

US 2010/0243231 A1   Sep. 30, 2010

(51) Int. Cl.
  *G05D 23/00* (2006.01)
(52) U.S. Cl. ........ 236/46 C; 165/137; 237/2 A; 700/276
(58) Field of Classification Search .................. 236/1 C, 236/46 C, 94; 165/237; 237/2 A; 700/276
  See application file for complete search history.

(56) References Cited

U.S. PATENT DOCUMENTS

| 5,197,666 | A | * | 3/1993 | Wedekind | .................... | 236/46 R |
| 5,395,042 | A | * | 3/1995 | Riley et al. | .................... | 236/46 R |
| 7,099,748 | B2 | * | 8/2006 | Rayburn | ....................... | 700/276 |
| 2008/0083834 | A1 | * | 4/2008 | Krebs et al. | .................... | 237/2 A |

\* cited by examiner

*Primary Examiner* — Marc Norman
(74) *Attorney, Agent, or Firm* — Marc E. Hankin; Kevin Schraven; Hankin Patent Law, APC

(57) ABSTRACT

A thermostat apparatus for controlling a heat pump with supplemental resistive heating as typically contained in a Packaged Terminal Air Conditioning (PTAC) unit is disclosed which provides improvements in energy management by reducing energy usage as much as possible within user guidelines when the conditioned space served by the PTAC is not occupied. A reduced setpoint temperature determination is based upon measurements of thermal response within the conditioned space to application of supplemental or resistive heat, and utilizes supplemental or resistive heat in achieving a quick recovery when people enter the conditioned space, thus enabling a more reduced setpoint temperature when the space is not occupied.

12 Claims, 5 Drawing Sheets

ENERGY MANAGEMENT IMPROVEMENT FOR A HEATING SYSTEM WITH REDUCED SETPOINT TEMPERATURE DURING NO OCCUPANCY BASED UPON HISTORICAL SAMPLING OF ROOM THERMAL RESPONSE WITH HIGHEST POWER HEAT APPLIED

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to the art of environmental control systems, to thermostats or thermostat apparatus which control heating, ventilation and cooling systems, and in particular to those thermostats which control a heating system that includes a heat pump apparatus in addition to apparatus that provides for additional or alternative auxiliary heating. Such apparatus includes a heat pump or "compressor" which incorporates also some form of resistive heating, and also heat pumps used in conjunction with heat strips or resistive heating apparatus which are not incorporated in the actual cabinetry of the heat pump. More generally, the present invention relates to heating systems and the control of heating systems which incorporate multiple means of heating, each with its own level of efficiency in energy usage.

Energy usage for environmental control, especially for heating or cooling, is a major expense in the entertainment and motel/hotel industries. Even minor changes in environmental control procedures can result in significant energy and cost savings. Typical approaches for saving energy include such procedures as manually turning off a heating or cooling system when a room is not used, or reducing the level of heating or cooling based upon some sequence of programmed control by a thermostat.

Energy savings can be achieved by use of a control mechanism which takes into account whether a room is predicted to be occupied, and further savings can be achieved if the detection of occupancy and a programmed response to changes in occupancy is automated. Therefore, in order to provide a thermostat with information regarding occupancy of a room or area, designers of thermostats have incorporated motion detectors or occupancy sensors, or have provided for input to the thermostat from an external occupancy sensor which informs the controlling mechanism of the thermostat when the conditioned space served by space conditioning equipment (a heating, cooling, and/or ventilation system) is "unoccupied" meaning that no people (or animals) are detected, presumably in the conditioned space, by the occupancy sensor.

Occupancy sensors are implemented using various types of motion detectors, such as infrared motion detectors, and could be implemented with other mechanisms which sense the presence of a person in a room, or which sense entry of a person into a room or conditioned space. These and other methods are known in the art or could be devised by one knowledgeable in the state of the art.

In the entertainment or hotel/motel industries, considerable energy savings can be gained, during periods when the outside temperature is low and heating is normally required, by reducing the temperature setpoint when a room is unoccupied. During a time when heat is typically needed, and a specific room or space is unoccupied, energy can be saved by reducing the temperature setpoint as utilized by the thermostat in that room from the "normal" setpoint, that is, the normal occupied setting. For example, if the room temperature normally desired when a room is occupied was 72 degrees Fahrenheit, and the outside temperature was 40 degrees, it would save energy to set the setpoint temperature to 62 degrees when the room is unoccupied, and then return the setpoint temperature to 72 degrees anytime occupancy is again detected. More savings in energy costs could result if the setpoint temperature was reduced even further to less than 62 degrees. Reducing the setpoint temperature by one degree Fahrenheit can save several percent on energy costs, and even eliminate the need for any heat on days when outside temperatures are not too much lower than a reduced setpoint temperature. One government study by the U.S. Department of Energy showed about a five percent savings for one degree Fahrenheit reduction in setpoint temperature over an entire year (1997 study from http://www.eia.doe.gov/emeu/consumptionbriefs/recs/thermostat_settings/thermostat.html).

However, reducing the temperature of a room during periods of no occupancy can have the unwanted side effect that the room may be uncomfortably cold when a guest returns after a period of non-occupancy, and if the heater cannot respond to warm the room quickly enough this may make the guest feel cold, unhappy, and/or dissatisfied.

One of the more efficient devices for heating with regards to energy usage is a heat pump. Within a range of outside temperature, a heat pump can produce more energy in the form of heat from a kilowatt of input energy than can a heat strip or electric coil heater. Using a heat pump instead of electric heat strips to heat a room can reduce energy usage by a factor of one-half or better. That is, one kilowatt of input power applied to a heat pump can produce anywhere from one to three kilowatts of equivalent heating energy in comparison to use of electric heat strips, radiant heat, or any form of resistive heating. A heat pump is most efficient when outside temperatures are near to a desired indoor temperature. For example, if a desired indoor temperature is 72 degrees Fahrenheit, then a heat pump would be efficient at temperatures near 72 degrees. Heat pump efficiency decreases at lower outside temperatures, and at temperatures somewhere around freezing, a heat pump is no longer more efficient than resistive heating. The characteristics of such heat pump technology are well known in the art.

Heat strips, radiant coils, or other similar methods of producing heat by converting electrical energy directly to heat energy are commonly called "resistive" heating. "Resistive" meaning that heat is produced by running electricity through a resistive medium and thus producing heat. Heat strips can be easily manufactured at low cost, and a typical heat coil or heat strip can typically produce more heat in a short time than what can be achieved by a heat pump, but typically in a less energy efficient manner. That is, a heat strip or resistive heating mechanism can typically produce more heat than a heat pump or can produce heat in addition to a heat pump, but at higher cost than use of a heat pump alone.

Therefore, heat pumps are typically used for both residential and commercial heating for economical reasons and resistive heating is typically used only when outside temperatures are such that heat pumps either no longer can produce the required heat, or at which efficiency of the heat pump is less than that of resistive heating. It is noted also that heat pumps are typically implemented as apparatus which can either cool or heat, that is, a heat pump can "pump" heat either into or out of a room or building. Resistive heating however cannot be used directly for cooling, that is, there is no way to run a resistive heating coil or strip in "reverse".

It is further noted that although heat pumps producing "compressor" heat will often be more efficient in their use of energy than heat strips or resistive heating, that there are times when resistive heating is required to supplement or replace use of the heat pump. The choice of whether resistive heat is used by itself when necessary or as a supplement to heat pump heating depends on several factors such as local building codes, the size of the wires feeding the heat pump/resistive heating strips, the size of the breaker or fuse feeding the heat pump unit, or other factors. These considerations are well known in the art.

In a thermostat apparatus for control of a heating apparatus providing heat to a room or conditioned space in which the thermostat apparatus includes occupancy or non-occupancy in determination of a setpoint temperature, energy can be saved by reducing the setpoint temperature of the room when the room is not occupied. When the room then becomes occupied after a period of no occupancy, the "recovery time" in restoring the room temperature to its desired value is important in keeping the occupants of the room warm and happy. People may not tolerate having the room too cold for any extended length of time after they occupy the room. During a period of no occupancy, the highest level of energy savings would be achieved if the heating apparatus serving the conditioned space was completely disabled, or maybe a safer alternate approach would be to set the setpoint temperature very low such as just above freezing (32 degrees Fahrenheit) to keep the water pipes or any other water in the room or fixtures of the room from freezing. This would mean that whenever the conditioned space was unoccupied, the heater would be turned off, and the temperature in the conditioned space would drift lower towards the outside temperature. Then, when someone entered the room the heater would be turned on and it would take some period of time before the heater could heat the conditioned space back to the desired temperature. This time for returning the temperature in the room to the user's or occupant's desired room temperature, following a period of non-occupancy during which temperature in the room has been reduced is termed the "recovery time".

Since many outside factors come into play in determining how fast the temperature in a room will change when heat is applied, it would not provide maximum benefit for the thermostat to simply use some predetermined fixed rate of room response in calculation of a non-occupied setpoint temperature. It is also not of greatest benefit to simply use a predetermined setback which does not take into account current conditions. Approaches such as these, if properly programmed, may provide for acceptable recovery times but would not provide for maximized energy savings, or if programmed for good energy savings the recovery time would be likely go beyond what would be tolerated by the occupants.

BRIEF SUMMARY OF THE INVENTION

The present invention recognizes that if the recovery time is too long when people enter a room following a period of no occupancy, then the temperature in the room may be uncomfortably cold for too long of a period. Therefore, the present invention provides for a control plan that reduces the setpoint temperature by a calculated amount from the user's normally preferred room temperature during periods of non-occupancy rather than completely turning off the heating apparatus. This provides the advantage of controlling the recovery time because the room remains close enough to the preferred temperature to allow recovery within a desired amount of time. The present invention also makes provision for reducing the setpoint temperature as far as possible while still providing for recovery in a reasonable time. This is achieved by making measurements of the room's response (rate of room temperature change) to application of heat and reducing the setpoint temperature as far as possible while still providing for good probability of recovery within a desired time limit. The amount of temperature setpoint reduction (setback) that is achievable is maximized by making measurement of the room's response during a time period when a maximum amount of heat is being applied by the heating apparatus, and then calculating a setback temperature assuming that the same maximum amount of heat can be applied if necessary during any recovery period (recovery to a normally desired temperature after maintaining a reduced temperature during a period of no occupancy).

When the room is unoccupied, it is desirable to save energy by reducing the temperature setpoint as far as possible, while still providing for recovery, when the room is again occupied, to a comfortable temperature within a desired or reasonable length of time. The calculation of the reduced setpoint is made based upon an assumption that a high or maximum amount of heat will be available when recovery is needed. For example, in a typical heat pump which includes resistive heat strips, the reduction in setpoint temperature for a period of no occupancy will be calculated by measuring the room's response during a period of high heat application (resistive heat, or both compressor and resistive heat together). The measured room response during application of high heat is used to calculate the lowest temperature setpoint possible from which recovery is possible within a desired time. While the room remains unoccupied the lowest possible setpoint temperature, from which recovery in good time is possible, is maintained primarily with "compressor" heat, that is, the most efficient heat.

The measurement of the room's response rate can be made anytime that "high heat" (more powerful, but less energy efficient) is invoked, and the use of high heat can be forced when necessary to update the measurement. During a long period of no occupancy, when the room temperature is reduced and being maintained normally by only compressor heat (most efficient heat), it may be desirable to occasionally force, for a brief but measureable period, the application of resistive heat (high heat). This provides for an update of the measurement and allows the reduced setpoint temperature (setback) to be recalculated.

Note that during periods of no occupancy that the most energy efficient mode of heating available would be utilized, which in most cases would be compressor heat (efficient heat). The forcing of high heat (resistive heat) for brief periods during the periods of no occupancy would use only a small amount of energy for a brief time, just long enough to measure the room's response. The application of high heat during no occupancy is just to predict a recovery rate using high heat; it is not for "maintenance" of the reduced setpoint temperature. Forcing a measurement once an hour, once a day or at even more infrequent intervals might be reasonable. "Forcing" of the measurement might not even be needed at all if a measurement of the room's response during a "natural" application of high heat has been performed.

Note also that it may not be necessary to "force" application of high heat during a recovery period (when occupant's return). If the room temperature has dropped only a couple of degrees, the compressor might easily recover within the desired time. It is the calculation of a reduced setpoint temperature assuming high heat can be used for recovery that is the key to increased energy savings. It is not the actual application of high heat during the recovery period that saves energy. That is, measuring the room's response rate during application of high heat and calculating a reduced setpoint temperature based upon that measurement provides for a greater reduction in setpoint temperature during periods of no occupancy than achievable with the prior art.

The present invention is directed to a system and method for striking a balance between "recovery time" and the potential for increased energy savings while keeping occupants of the room reasonably happy (or at least warm). The present invention makes utilization of measurements of the room's response to application of heat, and utilizes those measurements to calculate a reduced setpoint temperature to be used during periods of no occupancy while still providing for an adequately short period of recovery when the room again becomes occupied. Energy savings is improved over the prior art by making measurements of a room's thermal response rate during application of the most powerful heat source available.

Recovery time depends on many factors and is not easily predictable. Outside temperature, the temperature of adjoining rooms, the effectiveness of insulation, the wind speed, and other things not controlled by the thermostat are examples of outside factors that affect recovery time, that is, the time it takes to return a room to a comfortable level. It is useful therefore to include means for a thermostat to use historical measurements to provide basis for making an estimate or to calculate a predicted recovery time for purposes of adjusting the setpoint temperature during periods of non-occupancy to a level which achieves improved energy savings while still providing for adequate heat quickly enough to keep occupants happy when they return after a period of non-occupancy.

Recovery time is not only affected by outside factors, but also by how much heat can be provided by the heating apparatus when heat is required. As discussed above, turning on the heat pump may be the most energy efficient method of generating heat, but it may produce heat much more slowly than turning on a heat strip, resistive heating coils, or other alternative sources of heat. According to the teachings of the present invention, recovery time can be reduced by applying heat generated with resistive heating during the recovery period immediately following a period of non-occupancy, rather than using only a heat pump. In some heating systems it might also be possible to turn on both the heat pump and resistive heating or to apply other means of heating to achieve the fastest recovery. Supplying more heat during a period of recovery will shorten the period of recovery. That is, during a period of time following a period of no occupancy, it will reduce the period of recovery if more heat than "normal" can be applied in order to restore the room temperature to the user's determined "normal" setpoint temperature as quickly as possible.

Heating units called PTACs are used in many hotel and motel rooms with a PTAC typically designed to heat or cool a single room (or suite). PTAC stands for "Packaged Terminal Air Conditioning" unit and the "air conditioner" inside a PTAC is commonly a heat pump capable of both heating and cooling. PTAC units typically powered only with electricity, but some also utilize natural gas or other sources of energy for supplemental heat. Electric heat strips are often integrated into a PTAC unit to provide for heating when outside temperatures are near or below freezing, or when the heat pump is not capable of producing enough heat to maintain a desired temperature in the room. The PTAC unit may itself determine when to use heating strips based upon a measurement of outside temperature. The PTAC unit may also be controlled by the thermostat device to use electric strip heating when the thermostat determines that the heat pump is not keeping up with the need for heat. Some PTAC units provide for simultaneously turning on both the heat pump and resistive heating, while others provide for turning off the heat pump when resistive heat is being used. Under certain conditions such as an outside temperature significantly below freezing (say 26 degrees Fahrenheit) a heat pump may turn on electric heat strips to supply heat even without signal from the thermostat. That is, the thermostat may signal the PTAC to produce heat with the heat pump, and the PTAC would turn on heat strips, or both the heat pump and heating strips might be turned on depending on design choices. Thermostats for control of a PTAC commonly provide for at least one signal to the PTAC intended to turn on the heat pump, and a second means of signaling for resistive heat (sometimes called "emergency" heat when the heat strips are applied alone, without the heat pump).

Use of "resistive" heating may or may not preclude or include applying the heat pump at the same time. That is, when high heat is needed, resistive heat may be chosen to replace the heat pump (the heat pump is turned off) or supplement the heat pump (both are turned on). The use of one or both may also be changed as conditions change such as when the room temperature nears the setpoint temperature.

The thermostat apparatus may also not be in complete control of the choice of using a heat pump, resistive heating, or both. Heat pump units may include their own "decision making" circuitry or protective devices which may be wired based upon or according to local building codes or by choice of the manufacturer of the unit. For example, a PTAC unit may preclude use of both the heat pump and resistive heating, even though the thermostat sends signals (or a signal) for both. At low outside temperatures, a PTAC may ignore a signal for use of a heat pump and turn on resistive heating in response to a signal from the heat pump for any kind of heat.

An illustrated embodiment of the present invention includes a thermostat apparatus for controlling a heating apparatus. The heating apparatus includes two sources for providing heat, a first heat source being a more energy efficient source of heat such as a heat pump, and a second heat source which may be less economical or less efficient but which will produce added heat in place of or in addition to the first heat source. Resistive electric heat strips are an example of this second type of heat source. A heat pump and resistive heat strips can be incorporated into the same heating apparatus such as inside a PTAC unit, or a heat pump can be provided in a first package and resistive heating or other heating source contained in a second package such as a baseboard heating device, separate from the first package.

Using a heat pump with resistive heating in a PTAC can be used in an example of an illustrated embodiment of the invention. The illustrated embodiment thus comprises a thermostat apparatus coupled to be in control of the PTAC. For purposes of illustration the PTAC can be considered as installed to serve as a heating source for a hotel/motel room or any "facility".

In the illustrated embodiment, the thermostat apparatus is provided with means for detecting or sensing occupancy in the room, and the thermostat apparatus is further provided with means for measuring the temperature at some location in the room.

Additionally, the thermostat apparatus is further provided with means for controlling the PTAC with a plurality of signals including a signal for turning on or off the heat pump, and a second signal for turning on or off the resistive heating.

The thermostat apparatus also has provision for entering, by user input in ways well known in the art, a "setpoint temperature" which is the temperature desired in the room, and which is compared with the presently detected temperature in the room to turn on or off the heating mechanism, for maintaining the room temperature close to the desired setpoint temperature. The "closeness", or tolerance, in temperature allowed, the protection of the heat pump mechanism and many other factors affecting how thermostats typically are used in control of a PTAC unit or other similar devices are well known in the art or could be determined by one skilled in the art.

The thermostat apparatus may optionally include program means for adjusting the user's desired setpoint temperature based upon time of day, the day of the week in addition to providing other program information as well known in the art or as might be designed by one knowledgeable in the art. Provision for adjusting the setpoint temperature may be provided as a part of the thermostat through an input mechanism, and/or may be provided from some centralized or remote control station or other input source.

For exemplary purposes, in this description it is assumed that outdoor temperatures are such that the room must be supplied with heat in order to keep it close the user's desired temperature.

While the room is occupied, the thermostat apparatus utilizes the control signals to turn on or off the heat pump and/or the resistive heating apparatus in order to keep the measured room temperature close to the desired setpoint temperature. It should be recognized that the desired setpoint temperature may itself be changing under thermostat program control, in response to remote signal from a central control unit, in response to user input, or other similar adjustment. According to the teachings of the present invention, the heat pump is used as a first choice for supplying heat because it is more energy efficient than the resistive heat, but resistive heat will be used if necessary when the more efficient energy source cannot supply enough heat.

In order to save energy when the room is found to be not occupied, or after some period of no occupancy, the thermostat apparatus will reduce the setpoint room temperature from the normal desired setpoint. It is important that the thermostat apparatus determine the level of reduction for a reduced setpoint temperature to be used during the period of no occupancy, which will be discussed further below.

According to the teachings of the present invention, when occupancy is again detected, and when the temperature of the room has drifted lower, the thermostat apparatus turns on either the heat pump or the resistive heating or both for a period of time until the room temperature reaches the desired temperature defined as the "recovery period".

If the room again is again detected to be unoccupied before the recovery period is completed, the thermostat apparatus (actually the designer or one skilled in the art) could optionally choose to abandon the recovery and return to use of the reduced setpoint temperature as the present setpoint (since the room is now not occupied).

The illustrated embodiment of the present invention further includes a means of providing to the thermostat apparatus a value or estimate of time desired by a user of the thermostat as a limit on the time for temperature recovery (the recovery period). This value allows the thermostat apparatus to strike a desirable balance between a first goal of achieving energy savings and a second goal of returning the room to the user's desired temperature within a reasonable amount of time.

As previously mentioned, recovery time can be reduced by applying resistive heat in addition or in place of using just the heat pump during the recovery period. Utilizing this observation, the illustrated embodiment of the invention provides for using resistive heat during the recovery period, and for using or signaling for resistive heating when in a recovery period following a period of non-occupancy in order to reduce recovery time. That is, the goal is to signal the PTAC to generate as much heat as possible during the recovery period, in order to make the recovery period as short as possible. This allows the reduced setpoint temperature to be optimally set near the lowest temperature from which a recovery time is short enough to be tolerable by the users, (where "tolerable" may be defined in terms of owner energy costs rather than occupant comfort).

In order to calculate or estimate "recovery time", the control mechanism for the thermostat estimates or determines the recovery "rate", that is, the rate at which a heat source can raise the temperature of the room. "Recovery rate" is an estimate of how fast the temperature in a room can be changed when applying energy for heat. "Recovery time" is dependent on how much heat can be applied AND how many degrees of temperature the room is away from normally desired setpoint temperature (the temperature the user desires when the room is occupied, which may vary according to program settings or be changed by the current occupant).

For example, if a PTAC unit can provide heat that will heat a specific room at the rate of one degree every ten minutes, and if the owners of a facility (e.g. motel) established a recovery time of thirty minutes as a requirement, then the setpoint temperature during periods of non-occupancy could be calculated and set by the thermostat three degrees below the normally desired setpoint (i.e. a rate of thirty minutes at one degree per ten minutes).

In another room, or under different outside conditions, such as when the adjacent rooms are already warm, the PTAC may be able to heat the room at a significantly higher rate such as a rate of one degree every two minutes instead of ten minutes. This would allow a temperature setback of fifteen degrees while still providing for a thirty minute recovery time, thus providing for increased energy savings during periods of non-occupancy in comparison to a smaller setback (higher setpoint temperature).

Therefore, according to the teachings of the present invention, the illustrated embodiment further includes as part of the thermostat apparatus, means for estimating recovery rate under current conditions in order to determine a non-occupied reduced setpoint temperature which provides for maximized energy savings, while still providing for a recovery time that is short enough to keep everyone reasonably satisfied, or at least satisfied enough according to the owners of the building, or the person or company paying for the energy.

The illustrated embodiment of the present invention provides a means of determining an estimated temperature recovery rate based upon historical measurements of a room or space's in actual measured response to application of heat. In an illustrated embodiment of the present invention, a thermostat is used for controlling when a PTAC unit is turned on, and also for providing signals to the PTAC in establishing the desired method for providing heat, that is, through either heat pump and/or resistive heating. The thermostat also is provided with an indication of the current room temperature. The thermostat apparatus can thus estimate a room's response rate by observing and storing for later use a value indicative of how fast the room's temperature changed when heat was last applied, and in particular for measuring and storing a response rate when the PTAC unit was last signaled to produce maximum heat. The use of a maximum heat mode provides for quicker recovery than use of just the heat pump, and gets the room back to the user's desired temperature as quickly as possible.

The illustrated embodiment of the invention thus provides in a thermostat apparatus in control of a PTAC, a mechanism for signaling the PTAC to produce either "normal" heat or "maximum" heat, with "normal" typically denoting the use of the heat pump within the PTAC, and "maximum" denoting the utilizing of resistive heating. The illustrated embodiment of the invention further includes a mechanism for measuring the response rate of the room being served by the PTAC. (Response rate, or recovery rate meaning how fast does the room heat up when heat is applied).

The illustrated embodiment further provides a mechanism for storing the measured room response rate when maximum heat was last signaled to the PTAC.

Additionally, the illustrated embodiment may optionally further include a mechanism for periodically applying maximum heat to the space or room in order that the last measurement of response rate under maximum heat production remains current enough (up-to date, or recent) to be useful. This "forced" measurement using "maximum heat" (resistive heat) may be necessary when the temperature in an occupied room with no heat applied drops below a temperature from which recovery within the maximum time can be achieved using only the heat pump. In this case, a measurement is needed to determine the "measured response rate" with maximum heat applied, which requires turning on the signal for resistive heat (maximum heat) for a period long enough to measure a change in room temperature, and to determine from measurement of the period of time and the change in room temperature a "slew rate" or "measured thermal response rate" or "conditioned space temperature response rate".

Periodically, a measurement is made of the room's response rate during application of maximum heat. That is, the PTAC is periodically signaled to produce maximum heat, which would typically turn on some form of resistive heating. The thermostat mechanism measures the response rate of the room, by measuring how long it takes for the room to be heated from the room temperature at the start of the measurement to some higher temperature at the end of the measurement. Selection of a period of measurement can be designed in many ways such as for a fixed period of time, or for one heating cycle. The measurement period could be determined based on how long it takes to change by some fixed number of degrees of temperature (such as one-half degree, or one degree). The most obvious selection of a time of measurement period would probably be for one normal heating cycle, that is, measuring for one period while the thermostat is doing its normal job of turning the heat on when the temperature gets too low, and turning it off when it reaches the desired temperature. Measuring the time it took in comparison to the change in temperature from the beginning of the cycle to the end would allow determination of the room's response rate.

It is important to note that there are no mandatory requirement to make "periodic" measurements of the room's thermal response rate. The measurements could be scheduled based upon many different approaches. More frequent measuring will make the estimate of recovery time more accurate, but if outside conditions remain about the same then additional measurements probably will not change the results much. In general, the more frequent the measurement the more accurate the estimate of response time, but with diminishing return on accuracy. Each measurement also does take additional energy, because the higher cost source of heat is being used, albeit fairly briefly, just long enough to register a significant change in temperature over a period of time. A change of 0.5 degrees Fahrenheit, or a period of five minutes would be exemplary values that would be likely to provide reasonable accuracy in the measurement of the room's thermal response.

The measurements could be scheduled at random intervals, or if the thermostat had knowledge of outside conditions, they could be scheduled in response to changing outside conditions. If the scheduling of measurements is being repeated a number of times during an extended period of no occupancy, this might allow the setpoint temperature to be adjusted to either save more energy or to be able to better meet the recovery time requirements. The most straightforward approach, and easily implemented, is to simply schedule the measurement every thirty minutes or at any chosen interval throughout any period of no occupancy. This detail could be chosen by a designer skilled in the art as necessary for ease of programming, cost, or to meet requirements of any special situations.

When a thermostat apparatus is first installed in a room or conditioned space there are some alternatives for establishing a reduced setpoint the first time it is needed. This problem arises during the period of time after a thermostat is first installed until a measurement of response to resistive heating can be made. When the room is first unoccupied after installation there may not have been time to make any measurements of response rate. There are many possible solutions to this problem which do not affect application of the present invention which are a part of the design and could be easily determined by one skilled in the art. For example, resistive heating could be applied or forced during the first period of non-occupancy to establish a first measurement. This measurement could be forced immediately for a short period of measurement, or the designer might choose to let the temperature in the room drift a few degrees below the normal setpoint before making the measurement. These "startup" and initialization issues are common to adaptive approaches such as those discussed above and can be solved or ignored as part of the choices made in designing a thermostat apparatus by one skilled in the art.

The illustrated embodiment of the present invention thus provides a thermostat apparatus that achieves energy savings beyond what is achieved by thermostats of the prior art. During periods of no occupancy, the present invention reduces the setpoint temperature as far as possible to a limit which is calculated to be the lowest temperature from which temperature in the room can be predicted to be recoverable within a user's desired maximum recovery time. The prediction is based upon historical measurements of actual response rate in the room. The prediction assumes that the heating apparatus during the period of recovery will provide heat at a maximum level, that is in a PTAC unit using "resistive" or other supplemental heating. The historical measurements used in making the prediction are made while this same "resistive" or supplemental heating is invoked. The invocation of this resistive or supplemental heat during the period of measurement can be forced, or the measurement can be made when the supplemental heat is needed in normal operation. The measurement can be forced as frequently as necessary to keep the prediction as accurate as deemed necessary by the designer or user of the thermostat. The measurement can be made either during periods of occupancy, or no occupancy. In a preferred embodiment of the invention, the historical measurement used in making the prediction would be performed during some portion of the period during which resistive or supplemental heat was last applied. For purposes of achieving a more accurate prediction it might be better to make the measurement during a period of no occupancy when the temperature in the room is near the current reduced setpoint temperature. The measurement could be made occasionally when the thermostat apparatus determines that heat is needed in the room to maintain the room temperature at the current setpoint, and then utilize resistive heating in order to enable that measurement. The frequency and time period for making these historical measurements could be determined by a designer skilled in the art.

The illustrated embodiment may further include means for pre-establishing at the factory, or by some means of programming, a user's desired maximum recovery time, or the user may be provided with a way to set or describe a maximum recovery time through direct input at the thermostat, or from a centralized control mechanism. The user's desired recovery time can be a fixed value such as thirty minutes, or it might be expressed as a function of time or programmed by the user to be dependent on time of day, day of week or other factors such as outside temperature. For example, it might be allowable for recovery time to be longer when the outside temperature is near the desired room temperature. It would not be a requirement, but it might in practice to not allow the user to establish unreasonable recovery times. For example, a recovery time of just a few minutes would not allow for much reduction in setpoint temperature during periods of no occupancy unless the resistive heating was very powerful.

Note that the use of the term "resistive" heating is exemplary. Any two alternate sources of heat with differences in energy efficiency would allow for practice of the invention.

It should be noted that the thermostat apparatus in another illustrated embodiment would, in addition to what is described above, store a slew rate value last measured when only heat pump heat was signaled, (that is, in addition to the slew rate value when only resistive heat was signaled. The heat pump heat only slew rate value is not necessary to practice the invention in its simplest form, but might provide some advantage in allowing the heat pump to be utilized alone (without the resistive heat) during a recovery period when it can be calculated that the recovery time using only the heat pump is less than the maximum time for recovery specified by the user.

This measurement of response to heat from the heat pump alone may be complicated by a heating apparatus such as a PTAC making its own decision on whether resistive heating is necessary. That is, the PTAC may in some cases utilize resistive heat even without such signal from the thermostat apparatus. This complication would typically arise only at temperatures near or below freezing (32 degrees Fahrenheit), and at these outside temperatures, resistive heating is likely to already be necessary for recovery, so the problem could be ignored at these temperatures by simply always doing recovery using resistive heating if the outdoor temperature is near or below freezing. Some thermostats are not provided with information concerning outside temperature, or it is an option on the thermostat, so in this case resistive heat would be used during any recovery period following non-occupancy.

It should be noted that even though the thermostat might "plan" to use the higher source of heat (resistive heat) to recover a room's temperature, it is not a requirement to do so. For example, during a period of no occupancy, the room temperature may not have reached as low a temperature as necessary to require higher cost resistive heating in order to recover within a specified maximum recovery time. In this case, "compressor" type heating would recover in time and should be selected to save energy costs.

In another further illustrated embodiment of the invention, measuring the conditioned space temperature response rate is done during application of high heat (resistive heat) and also during a period in which only "normal heat" (compressor heat, or more efficient heat) is applied. Given these two measurements the thermostat apparatus can "recover" following a period of no occupancy using the less efficient heating apparatus only as long as necessary, or maybe even not at all. That is, energy can be saved by using only as much higher cost heat as necessary to recover within the user's desired maximum recovery time.

It is noted that application of either compressor heat, or resistive heat or both may be occur in response to heating needs without necessarily forcing any application of heat just for room temperature response measurements. As an example, if the outside temperature is near or below freezing, use of resistive heat instead of compressor heat may be necessary in order to maintain a setpoint temperature. In some cases measurements can be made without being "forced" or scheduled. It would also be possible to implement such that use of any compressor or resistive heat would trigger a measurement, and that no "forced" or scheduled measurements would be scheduled, or at least not required.

BRIEF DESCRIPTION OF THE SEVERAL VIEWS OF THE DRAWING

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawing of which:

DETAILED DESCRIPTION OF THE INVENTION

Figure 1:
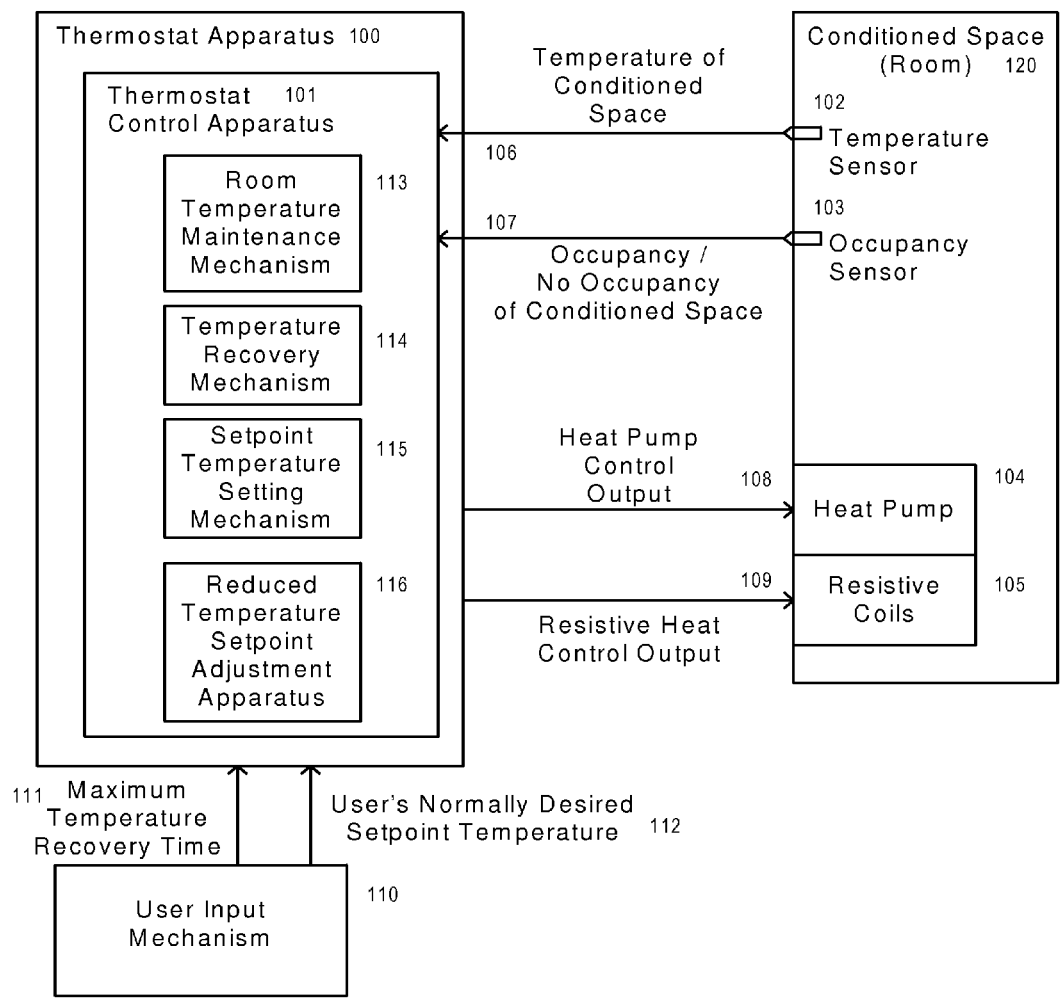
FIG. 1 is a diagram illustrating a thermostat apparatus with its output control signals, inputs from sensors and a user input mechanism in control of a heat pump with resistive heating installed in a conditioned room.

FIG. 1 provides illustration of a thermostat apparatus 100 incorporating components and controls for controlling a heat pump 104 with resistive coils 105 for use in heating a room or "conditioned space" 120. A temperature sensor 102 and an occupancy sensor 103 are installed appropriate in the room to be able to measure the room temperature and to monitor motion in determining occupancy or no occupancy. The temperature sensor and the occupancy sensor are illustrated as sending signals 106 and 107 to the thermostat apparatus. These sensors may also be incorporated in the thermostat apparatus itself, or attached to or included in the packaging of the thermostat apparatus. In most cases, the thermostat apparatus incorporating the sensors is packaged as a single unit and installed in the conditioned room or space in a good location for monitoring temperature and/or occupancy.

The thermostat apparatus as shown in FIG. 1 includes a mechanism for maintaining a desired room temperature (setpoint) which is labeled in the "Figure as a Room Temperature Maintenance Mechanism" 113. The room temperature maintenance mechanism turns on and off the heat pump and/or resistive coils using signals 108 and 109 which are labeled "Heat Pump Control Output" and "Resistive Heat Control Output" respectively.

For purposes of discussion of certain illustrated embodiments of the invention FIG. 1 includes also a "Temperature Recovery Mechanism" 114, a "Setpoint Temperature Setting Mechanism" 115, and a "Reduced Temperature Setpoint Adjustment Apparatus" 116.

The thermostat apparatus as illustrated in FIG. 1 receives input from a "User Input Mechanism" 116. The user supplies values for a desired "Maximum Temperature Recovery Time" 111, and the "User's Normally Desired Setpoint Temperature" 112.

The maximum temperature recovery time in a hotel or motel would most likely be set or determined by hotel/motel management. This information could be provided in several ways, including preprogramming of the thermostat at any time including either at installation or at the factory; programming by maintenance personnel either locally at the thermostat (possibly with passwords or coded accessibility), or from a central or remote control node or computer. The maximum recovery time itself could be a fixed length of time, or it could be programmable in a manner similar to other thermostat parameter programming. For example, the recovery time could be made longer during the day when people are likely to be more active, and then shorter in the evening, and then maybe somewhere in between at night. In a hotel or motel the recovery time might be significantly lengthened once there is an indication that the room is unlikely to be occupied for the entire night. The maximum recovery time could also be ignored during certain times of the day and a fixed setback temperature used instead.

The normally desired setpoint temperature can be provided in ways well known in the art. It would most likely be provided by an occupant of the room, but it could also be provided in a multitude of ways similar to those just discussed for the maximum temperature recovery time.

A thermostat control apparatus 101 as illustrated in FIG. 1 implemented as a microcontroller or microprocessor with control memory and random access memory is a common way to control and utilize the components of a thermostat. It is not required that a programming element be utilized but advantages in cost and both ease of design through programming and flexibility of user programming can be provided in certain embodiments of the invention. In implementation of certain illustrated embodiments the apparatus included as part of the thermostat control apparatus can be microcontroller code stored in a control memory, and with the status and states of the thermostat described in specific locations in a random access memory.

The mechanisms and apparatus shown in FIG. 1 as exemplary can also be combined or divided in ways that do not affect the inventive concept of the embodiments. For example, the setpoint temperature setting mechanism and the reduced temperature setpoint adjust apparatus might be integrated as with common components or within the same section of microcontroller control code.

Figure 2:
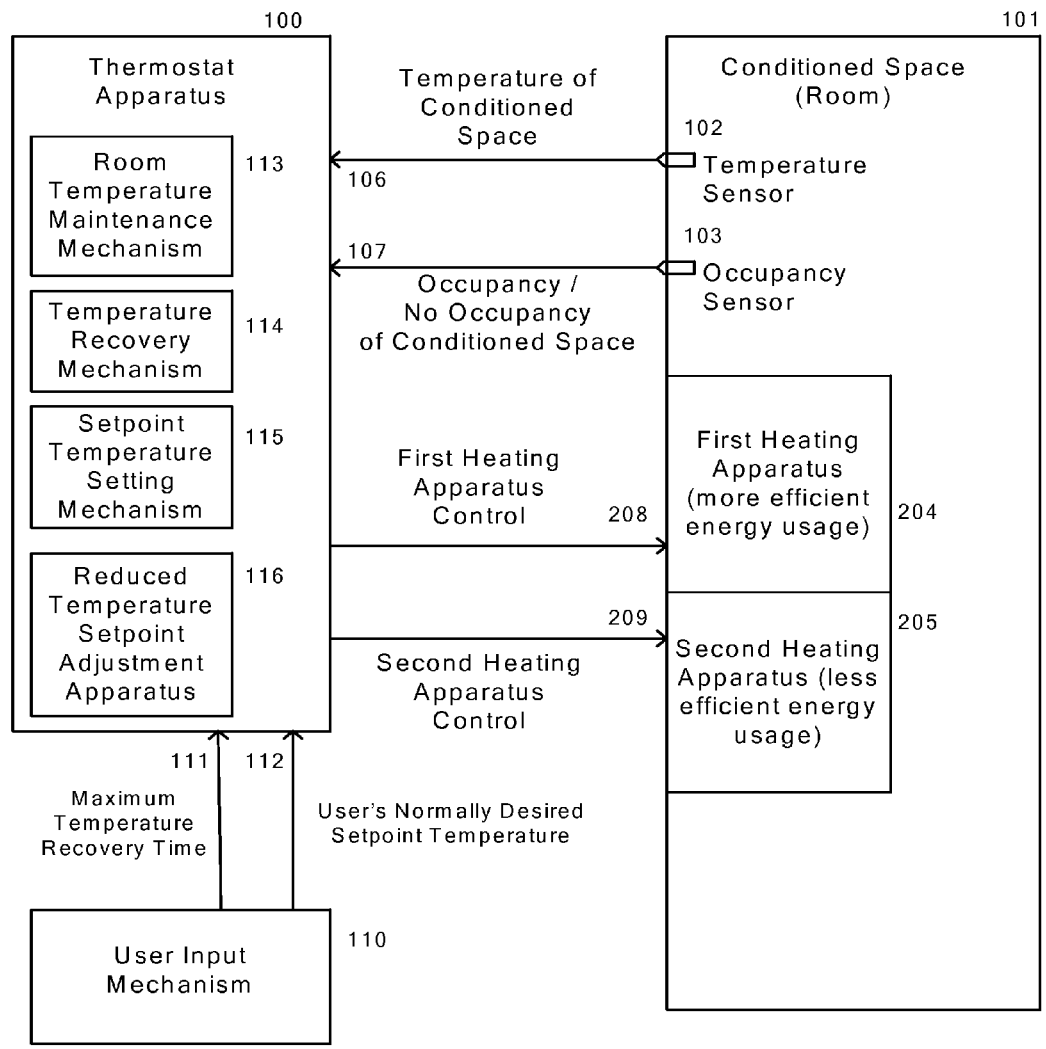
FIG. 2 is a diagram illustrating a thermostat apparatus with its output control signals, inputs from sensors and a user input mechanism in control of a first and second heating apparatus, with the first heating apparatus being more energy efficient than the second, but with the second heating apparatus capable, under certain conditions, of producing more heat than the first heating apparatus.

FIG. 2 depicts another illustrated embodiment which is a more general depiction of heating apparatus that might be controlled by a thermostat. In this illustration, which is similar to that in FIG. 1, the thermostat apparatus is illustrated as being in control of heating apparatus which includes both a first and second heating apparatus 204 and 205 respectively. These are controlled by a "First Heating Apparatus Control" 208 and a "Second Heating Apparatus Control" 209. That is, there are two sources of heat with different characteristics of cost and/or energy efficiency. An illustrated embodiment of the invention can be applied with almost any two alternative sources of heat in a room or conditioned space. For example, a heat pump as a first source of heat and a natural gas heater as a second source would provide two energy sources, with the heat pump likely to be more economical, but the natural gas heater likely to be much more powerful. Propane heat might be an alternative to electric resistance and in certain environments it can be imagined that either one or the other might be more economical. For example, electric heat in Tennessee might be economical but if the heater was small, propane or natural gas might provide quicker recovery of room temperature, albeit more expensive. The possibility of "idling" a room at a much reduced temperature during periods of potentially extended no occupancy has potential for very significant savings in energy costs. Note again that the first and second heating apparatus may be combined to produce more heat than available with either one. This is considered for purposes of these discussions to allow the second heating apparatus to actually include both mechanisms (apparatus) for heating.

Figure 3:
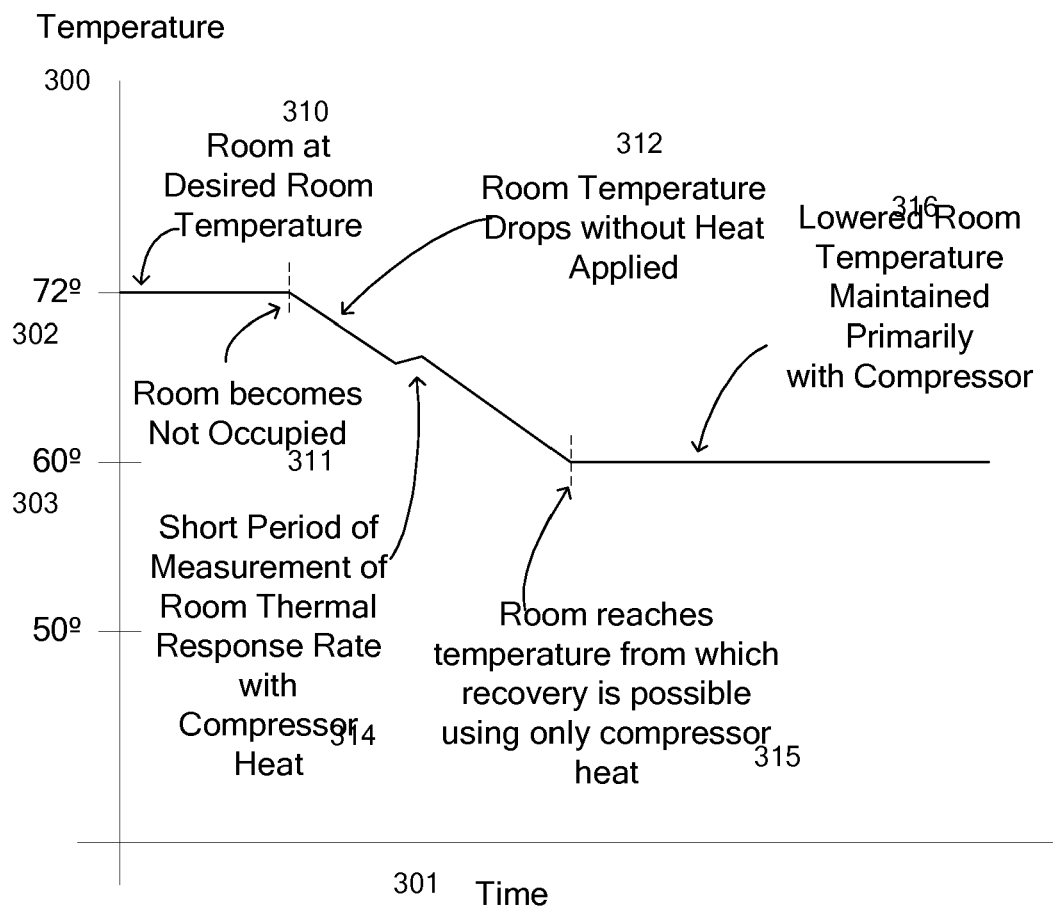
FIG. 3 illustrates one exemplary method of the prior art for reducing temperature in a room during a detected period of no occupancy.

FIG. 3 is an illustration showing the room temperature response during a period of occupancy followed by no occupancy, with the illustration showing how a reduction in the unoccupied setpoint temperature might be implemented, but without being as much a reduction as possible. The illustration uses a chart showing a room's temperature 300 on the Y-axis of a graph, and Time 301 on the X-axis of the same graph.

In FIG. 3, the illustration shows the room starting out being occupied 310 and maintained by the heating apparatus under control of the thermostat apparatus at 62 degrees 302. The room becomes unoccupied at the time shown as reference 311. With the room being unoccupied the thermostat apparatus responds by turning off the heat, and the room temperature begins to drop 312 (assuming it is cold outside).

After a period of time, the thermostat schedules invokes a brief measurement of the room's "thermal response rate". This measurement is made using "standard" or "normal" heat which in this example is the heat pump (or compressor). This allows the thermostat to calculate the temperature to which the present setpoint can be adjusted (knowing the maximum desired recovery time). In this example, the calculation provides a number of 60 degrees 303 and the room is allowed to drift down to that temperature at time 315, at which time the thermostat resumes natural operation and maintains the room temperature at 60 degrees in a standard manner (utilizing the heat pump, or maybe some resistive heating if the heat pump cannot keep up). The slope of the room temperature charted at reference 314 is the thermal response rate of the room under application of compressor (or heat pump) heat. If the room were to become occupied again, this is the slope that would be assumed to be achievable in recovering the room temperature to a desired "occupied" setpoint temperature.

Figure 4:
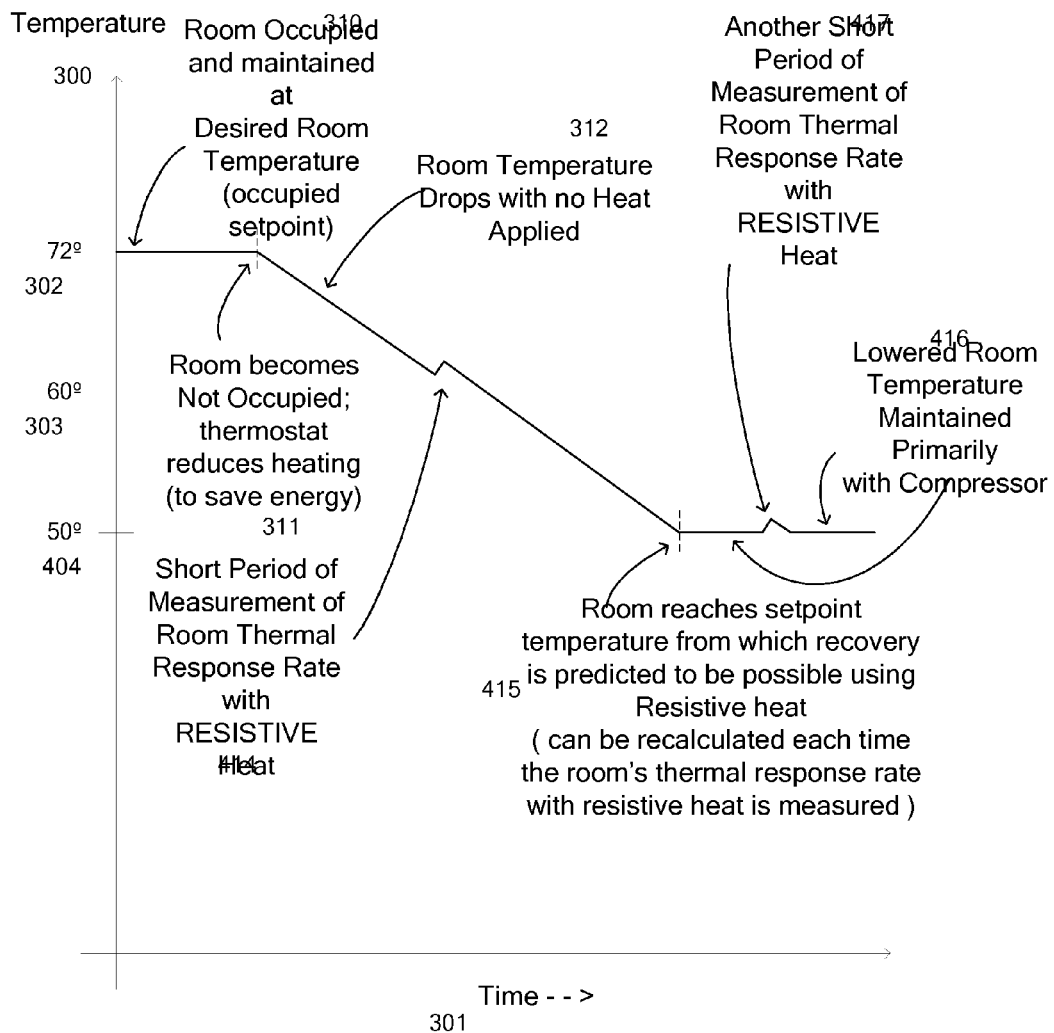
FIG. 4 illustrates a method for reduced energy usage according to the teachings of the present invention as compared with the prior art.

FIG. 4 illustrates an advantageous way to allow dropping the setpoint temperature significantly further during periods of no occupancy. In FIG. 4, as in FIG. 3, the room temperature is maintained 310 at the desired room temperature specified as an "occupied" setpoint. The occupied setpoint temperature may itself vary during the day in response to user changes, user programming of the thermostat, in response to central office signals, or in other ways. When the room is detected or determined to have become unoccupied 311, it is desirable to reduce the setpoint temperature in order to save energy. If no heat is applied (and the outside temperature is lower than the inside temperature) then the room temperature will begin to drop as shown marked by reference 312. The question for the thermostat to answer is how low should the temperature be allowed to drop, which saves energy, while still trying to meet the comfort requirements of being able to recover (restore) the room temperature to the desired level when occupancy is again detected, not necessarily knowing for sure when that might be. To facilitate calculation of the maximum reduction in setpoint temperature, a measurement of the room's thermal response rate is made 414 under application of the most heat that the heating apparatus can produce. (This is typically "resistive" heat, or it may be a combined heating of both resistive elements and compressor heat). The slope of room temperature in response to maximum heat in conjunction with the user specified maximum recovery time, allows a reduced setpoint to be calculated. After the measurement, 414, the room temperature is allowed to again drift lower (because no heat is being applied) until the room temperature reaches 415 (or is already below) the newly calculated reduced setpoint temperature. At this time, the thermostat resumes its normal work of keeping the room at that reduced setpoint temperature 416, this "maintenance" normally being done by the more economical compressor heat, unless the compress cannot keep up.

This reduced setpoint temperature could then be maintained until occupancy is again detected or determined.

In a further illustrated embodiment the accuracy of the predicted recovery time, and/or the calculation of the reduced non-occupied setpoint temperature can be improved by periodically invoking the "resistive" (or maximum) heat, and again 417 measuring the thermal response rate of the room. The calculated reduced setpoint temperature could then be adjusted either up or down, keeping the idea that the lowest setpoint temperature possible, while still predicting recovery in less than the maximum recovery time, will achieve the most energy savings.

A formula that provides the lowest reduced setpoint temperature based upon the measured thermal response rate of the room, and the user's specified maximum desire recovery time is as follow:

Lowest Allowed Reduced Setpoint Temperature=Present Desired Setpoint (in degrees) ... MINUS ... (Maximum Allowed Temperature Recovery Time (in minutes) ... TIMES ... Measured Thermal Response Rate (in Degrees per Minute)).

It may not be necessary to precisely calculate, store, or retain the reduced setpoint temperature in this manner, but the formula is illustrative of the concept being applied.

Figure 5:
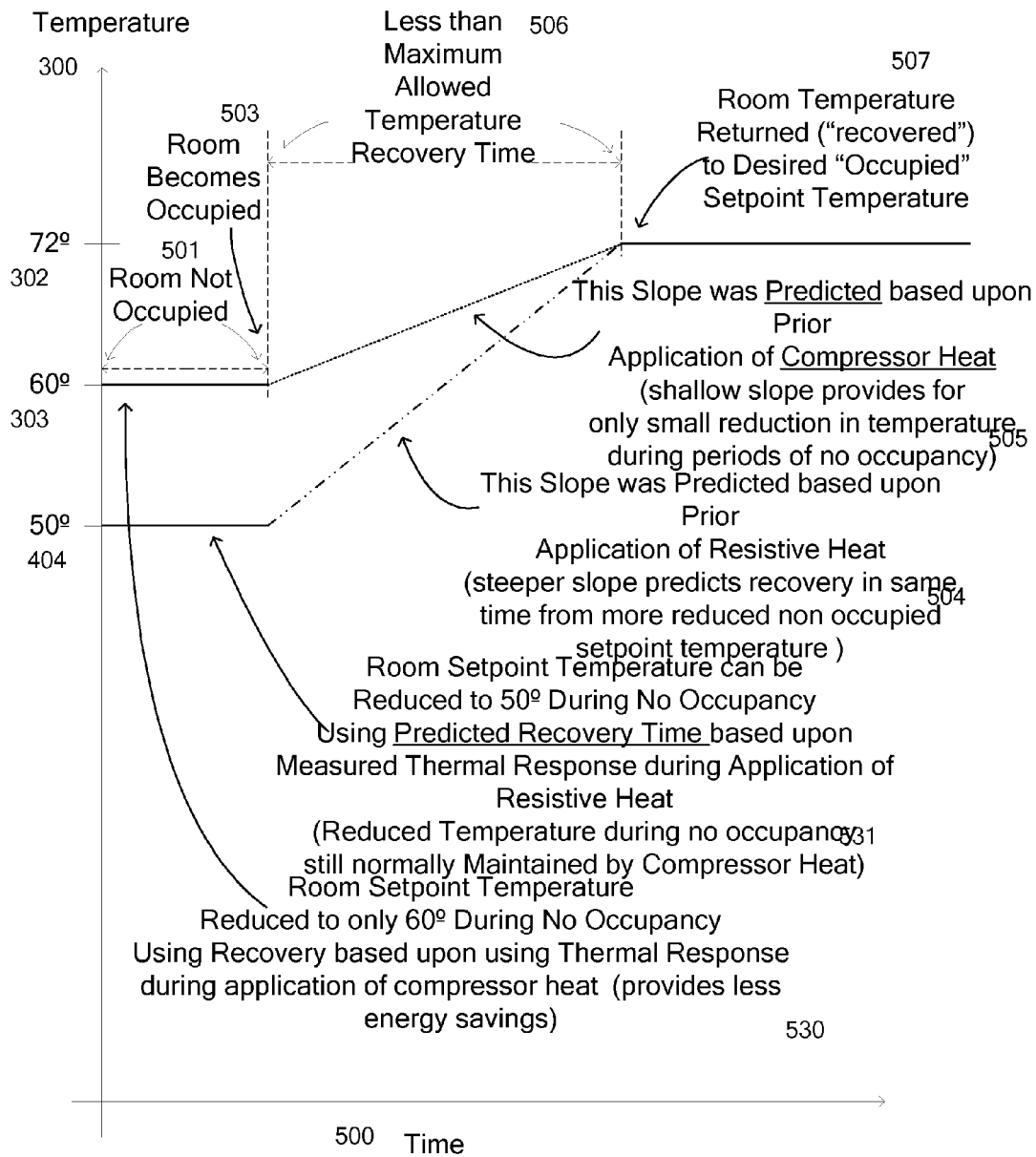
FIG. 5 is a detailed diagram for illustrating calculation and application of a reduced setpoint temperature for utilization during periods of no occupancy in comparison to that of the prior art which allows for reduced energy usage.

FIG. 5 illustrates the concept(s) necessary to determine (calculate) a reduced setpoint temperature that is to be utilized during periods of no occupancy based upon a plan of utilizing a more powerful heating source when recovery is needed. Note that FIG. 4 illustrates a measurement of a room's thermal response rate during application of heat, and then a prediction of recovery within a user specified period. FIG. 5 illustrates the period of recovery as predicted, not necessarily as might be actually achieved.

In FIG. 5 the X-Axis 500 is "time", and the Y-Axis 300 is "temperature". The left side of the graph illustrates two room temperatures 303 and 404 that have been calculated and then reached after some extended period of no occupancy. Reference 501 marks a period of these two exemplary temperatures maintained during no occupancy. The higher temperature of 60 degrees 303 is the maintained reduced setpoint temperature that would be determined if a predicted recovery time is calculated using only compressor heat as described 530. A further reduced temperature of 50 degrees 404 can be allowed for more energy savings if the reduced setpoint temperature is determined using a predicted recovery time based upon resistive heat as described 531. The two lines on the graph starting on the left from 50 degrees and 60 degrees illustrate maintaining the calculated reduced setpoint temperature as long as the room is not occupied 501. When the room is detected or determined to have become occupied 503, then heat is turned on, and the two lines illustrate a recovery in less than a maximum allowed temperature recovery time 506. Note that both lines illustrate prediction of a complete recovery within the same amount of time 506. At the time marked by reference 507, the desired room temperature (during any occupied period) is restored to an exemplary 72 degrees 302. In order to achieve recovery in the predicted amount of time, the slope of the line 504 from 50 degrees, must be steeper than the slope of the line 505 from 60 degrees. Achieving the steeper slope 504 requires using high heat or resistive heat and in order to predict this slope, the measurement of room response (measured slope) must have been made during application of high heat (resistive heat). This measurement and then prediction of room response rate under high heat enables the reduction of temperature during the period of no occupancy to a lower temperature than a measurement and prediction based only upon compressor (lower but more energy efficient) heat.

The energy savings being described is achieved during the period of no occupancy through the reduced setpoint temperature. Maintenance of that reduced temperature and recovery, can be done in a "normal" way, that is, as thermostats normally do, or improvement could be made such as utilizing compressor heating in a normal way and then if resistive heating is required to "keep up" utilizing that also for measurement of the room's thermal response rate.

Note that when occupancy is detected, the recovery itself is likely to use the more powerful heating source, especially when recovery is needed after a long period and it is cold outside, but depending on outside conditions, or the room temperature at the time occupancy resumes, this may not be necessary. Having said that, further savings can be achieved by measuring the thermal response rate of the room under both compressor heat, and resistive heat. This enables the thermostat to utilize the more expensive heating source only when necessary to recover in the required time. Without having both numbers, the thermostat would be required to utilize the more expensive heating source immediately upon resumption of occupancy in order to attempt to ensure recovery within the maximum time specified by the user.

While the invention has been shown and described with reference to specific preferred embodiments, it should be understood by those skilled in the art that various changes in form and detail may be made therein without departing from the spirit and scope of the invention as defined by the following claims. It will be apparent to one of skill in the arts that other embodiments incorporating the concepts may be used. It is felt, therefore, that these embodiments should not be limited to the disclosed embodiments but rather should be limited only by the spirit and scope of the following claims.

What is claimed is:

1. A thermostat apparatus for determining a present setpoint temperature, the thermostat apparatus for controlling a heating apparatus for heating a conditioned space, the heating apparatus including means for producing heat which includes a first heating apparatus and a second higher output heating apparatus, the second higher output heating apparatus optionally including the first heating apparatus, the second higher output heating apparatus being capable of producing more heat than the first heating apparatus alone; the thermostat apparatus providing a first signal for normal heat intended for turning on the first heating apparatus and a second signal for high heat for turning on the second higher output heating apparatus, the thermostat apparatus also including an occupancy sensor for determining when the conditioned space is occupied and when the conditioned space is not occupied; the thermostat apparatus including means for determining a user desired occupied setpoint temperature for use during periods the conditioned space is occupied;

the thermostat apparatus further comprising:
A) means for obtaining a value for a maximum allowed temperature recovery time, specified by the user as a parameter describing the maximum desirable period of time allowable for returning the conditioned space to a temperature approximating the user desired occupied setpoint temperature following any period of time during which the present setpoint temperature was reduced due to determining that the conditioned space was not occupied;
B) a first control means for turning on the second signal for high heat and during at least a portion of the time while high heat is applied measuring a high heat conditioned space temperature response rate;
C) means for calculating an unoccupied setpoint temperature based upon:
1) the high heat conditioned space temperature response rate; and,
2) the maximum allowed temperature recovery time; and,
D) means for setting the present setpoint temperature to the unoccupied setpoint temperature when the conditioned space is not occupied.

2. The thermostat apparatus of claim 1 further comprising:
E) means for quick recovery by utilizing the second higher output heating apparatus when it is determined that the conditioned space is occupied following a period during which the conditioned space was not occupied, the means for quick recovery intended to provide for returning the conditioned space to the user desired occupied setpoint temperature within the maximum allowed temperature recovery time.

3. The thermostat apparatus of claim 1) further comprising:
E) a second control means for turning on the first signal for normal heat and during at least a portion of the time while normal heat is applied measuring a normal heat conditioned space temperature response rate; and,
F) means for quick recovery by utilizing the second higher output heating apparatus when it is determined that the conditioned space is occupied following a period during which the conditioned space was not occupied, and the measured normal heat conditioned space temperature response rate provides indication that without use of the second higher output heating apparatus that recovery of temperature cannot be achieved in less than the maximum allowed temperature recovery time; and,
G) means for normal recovery by using the first signal for normal heat when it is determined that the conditioned space is occupied following a period during which the conditioned space was not occupied, and the measured normal heat conditioned space temperature response rate provides indication that applying heat from only the first heating apparatus will provide for recovery of temperature in less time than the maximum allowed temperature recovery time.

4. The thermostat apparatus of claim 1 wherein:
the measuring of the high heat conditioned space temperature response rate is repeated a number of times during any period of time while the conditioned space is not occupied.

5. An energy efficient method of operating a thermostat apparatus, the thermostat apparatus for maintaining a present setpoint temperature in a conditioned space by controlling a heating apparatus, the heating apparatus including means for producing heat which includes a first heating apparatus and a second higher output heating apparatus, the second higher output heating apparatus optionally including the first heating apparatus, the second higher output heating apparatus being capable of producing more heat than the first heating apparatus alone; the thermostat apparatus providing a first signal for normal heat intended for turning on the first heating apparatus and a second signal for high heat for turning on the second higher output heating apparatus, the thermostat apparatus also including an occupancy sensor for determining when the conditioned space is not occupied; the method comprising the following steps:
A) obtaining a user specified maximum allowed temperature recovery time, this being a user specified parameter describing the maximum desirable period of time allowable for returning the conditioned space to a temperature near the user desired occupied setpoint temperature, following any period of time during which the present setpoint temperature was reduced due to determination that the conditioned space was not occupied;
B) signaling the heating apparatus to use the second higher output heating apparatus;
C) measuring a high heat conditioned space temperature response rate, during a period that the second heating apparatus is signaled for use, by measuring a rate of temperature change in the conditioned space in response to the application of heat by the second higher output heating apparatus;
D) calculating an unoccupied reduced setpoint temperature intended for use when the conditioned space is found to be not occupied, based upon 1) the high heat conditioned space temperature response rate; and 2) the user specified desired maximum allowed temperature recovery time;

E) when the conditioned space is not occupied, setting the present setpoint temperature to the unoccupied reduced setpoint temperature.

6. The method of claim 5 wherein steps B, C and D are occasionally repeated during any period of time during which the conditioned space is not occupied for purpose of providing an updated measure of the high heat conditioned space temperature response rate, and calculating again the unoccupied reduced setpoint temperature.

7. A thermostat apparatus for controlling a heating apparatus for heating a conditioned space, the heating apparatus including a heat pump apparatus and a resistive heating apparatus, the heat pump apparatus typically providing more efficient heating of the conditioned space with regards to energy usage than the resistive heating apparatus, the thermostat apparatus including: a) a user input mechanism providing means for establishing a user's normally desired setpoint temperature which may be programmed by the user to be dependent upon time, b) means for receiving input from a temperature sensor located for providing an indication of a temperature in the conditioned space, and, c) means for receiving input from an occupancy sensing apparatus located for providing an indication that the conditioned space is occupied and in the alternative that the conditioned space is unoccupied, the thermostat apparatus further including an output control signal means including a heat pump control for signaling the heat pump to provide heat to the conditioned space and a resistive heat control for signaling the resistive heating apparatus to provide heat to the conditioned space, the thermostat apparatus in normal operation maintaining the temperature in the conditioned space to be near the user's normally desired setpoint temperature when the conditioned space is occupied, and in the alternative when the conditioned space is unoccupied maintaining the temperature in the conditioned space to be near a controlled reduced setpoint temperature; the thermostat apparatus further comprising:
  A) a coupling to a user input apparatus providing for user input establishing a maximum allowable temperature recovery time value corresponding to a user desired maximum time for temperature recovery in the conditioned space when the thermostat apparatus occupancy sensing apparatus detects a change in occupancy in the conditioned space from unoccupied to occupied;
  B) a reduced temperature setpoint adjustment apparatus which:
    1) measures a resistive temperature slew rate value during a slew rate measuring time interval which is at least a portion of a time when the resistive heating apparatus is providing resistive heating to the conditioned space, the resistive temperature slew rate value corresponding to a measured rate of temperature increase in the conditioned space observed during the slew rate measuring time interval; and,
    2) utilizes the resistive temperature slew rate value and the maximum allowable temperature recovery time value to establish the reduced setpoint temperature at a level lower than the user's normally desired setpoint temperature, for conserving energy, such that at any time if resistive heating were to be signaled by the thermostat apparatus to be applied by the resistive heating apparatus, the temperature in the conditioned space would be likely to return to the user's normally desired setpoint temperature within the maximum allowable temperature recovery time, thus enabling the controlled reduced setpoint temperature to be set lower than a value which could be used if only the heat pump apparatus were to be utilized in achieving temperature recovery; and,
  C) a recovery mechanism which turns on the resistive heat control output for at least a portion of a recovery time period, the recovery time period beginning when the conditioned space is occupied following a period in which the conditioned space was unoccupied, and the recovery time period ending when the temperature in the conditioned space reaches at least the user's normally desired setpoint temperature.

8. The thermostat apparatus of claim 7 further comprising a means of performing a forced update of the resistive temperature slew rate value, even when in normal operation resistive heat is not required for heating the conditioned space, by forcing activation of the resistive heat control output for a time sufficient to allow the temperature slew rate measurement apparatus to obtain a new resistive temperature slew rate value.

9. The thermostat apparatus of claim 8 where the forced update of the resistive temperature slew rate value is performed only during periods when the conditioned space is unoccupied.

10. The thermostat apparatus of claim 7 with the measurement of the resistive temperature slew rate value being made only when the heat pump alone is not able to supply a needed amount of heat to the conditioned space.

11. A method for maximizing the energy efficiency while heating a conditioned space using a thermostat apparatus for coupling to and control of a heating apparatus, the heating apparatus including a heat pump apparatus and a resistive heating apparatus, the heat pump apparatus typically providing more efficient heating of the conditioned space in terms of energy usage than the resistive heating apparatus, the thermostat apparatus receiving inputs from a temperature sensor located for providing an indication of temperature in the conditioned space, and from an occupancy sensing apparatus located for providing an indication that the conditioned space is occupied and in the alternative that the conditioned space is unoccupied, the thermostat apparatus including means for providing control outputs including a heat pump control output for signaling the heat pump to provide heat to the conditioned space and a resistive heat control output for signaling the resistive heating apparatus to provide heat to the conditioned space, the method comprising the steps of:
  A) operating the thermostat apparatus to maintain the temperature in the conditioned space to be near a user's normally desired setpoint temperature when the conditioned space is occupied, and when the conditioned space is unoccupied operating the thermostat apparatus to maintain the temperature in the conditioned space to be near a controlled reduced setpoint temperature, the controlled reduced setpoint temperature being set lower than the user's normally desired setpoint temperature for conserving energy;
  B) applying first user input to the thermostat apparatus to establish a normal setpoint temperature for use while the conditioned space is occupied as sensed by the occupancy sensing apparatus;
  C) applying second user input to establish a maximum allowable temperature recovery time value corresponding to a user desired maximum time for temperature recovery in the conditioned space when the thermostat apparatus occupancy sensing apparatus detects a change in occupancy in the conditioned space from unoccupied to occupied;

D) causing the thermostat apparatus to measure a resistive temperature slew rate value during a measuring time interval which is at least a portion of a time when the resistive heating apparatus is providing resistive heating to the conditioned space, the resistive temperature slew rate value corresponding to a measured rate of temperature increase in the conditioned space observed during the measuring time interval; and, E) the thermostat apparatus establishing the controlled reduced setpoint temperature utilizing the resistive temperature slew rate value and the maximum allowable temperature recovery time value to be set at a level such that if resistive heating were to be applied by the resistive heating apparatus, the temperature in the conditioned space would be likely to reach the user's normally desired setpoint temperature within the maximum allowable temperature recovery time, thus enabling the controlled reduced setpoint temperature to be set lower than a temperature value which could be used if only the heat pump apparatus were to be utilized in achieving temperature recovery.

12. A thermostat apparatus for controlling a heating system for heating a conditioned space, the heating system including a first heating apparatus supplying a normal heat and a second heating apparatus supplying an alternative heat, the first heating apparatus typically providing more efficient heating of the conditioned space in terms of energy usage than the second heating apparatus, the thermostat apparatus including means for receiving input from a temperature sensor located for providing an indication of a temperature in the conditioned space and also means for receiving input from an occupancy sensing apparatus located for providing an indication that the conditioned space is occupied and in the alternative that the conditioned space is unoccupied, the thermostat apparatus further including output control signal means including a first heating apparatus control output for signaling the first heating apparatus to provide heat to the conditioned space and a second heating apparatus control output for signaling the second heating apparatus to provide heat to the conditioned space, the thermostat apparatus in normal operation maintaining the temperature in the conditioned space to be near an established user's normally desired setpoint temperature when the conditioned space is occupied, and in the alternative when the conditioned space is unoccupied maintaining the temperature in the conditioned space to be near a controlled reduced setpoint temperature; the thermostat apparatus further comprising:

A) a coupling to a user input apparatus providing for user input establishing a maximum allowable temperature recovery time value corresponding to a user desired maximum time for temperature recovery in the conditioned space when the thermostat apparatus occupancy sensing apparatus detects a change in occupancy in the conditioned space from unoccupied to occupied;

B) a reduced temperature setpoint adjustment apparatus which:
  1) measures a high energy temperature slew rate value during a slew rate measuring time interval which is at least a portion of a time when the second heating apparatus is providing heating to the conditioned space, the high energy temperature slew rate value corresponding to a measured rate of temperature increase in the conditioned space observed during the slew rate measuring time interval; and,
  2) utilizes the high energy temperature slew rate value and the maximum allowable temperature recovery time value to establish the controlled reduced setpoint temperature at a level lower than the user's normally desired setpoint temperature, for conserving energy, such that at any time if the second heating apparatus is signaled by the thermostat apparatus to apply alternative heat, the temperature in the conditioned space would be likely to return to the user's normally desired setpoint temperature within the maximum allowable temperature recovery time, thus enabling the controlled reduced setpoint temperature to be set to a value lower than a value which could be used if only the first heating apparatus were to be utilized in achieving temperature recovery; and, C) a recovery mechanism which turns on the second heating apparatus control output for at least a portion of a recovery time period, the recovery time period beginning when the conditioned space is occupied following a period in which the conditioned space was unoccupied, and the recovery time period ending when the temperature in the conditioned space reaches at least the user's normally desired setpoint temperature.

* * * * *